(12) United States Patent
Dozier et al.

(10) Patent No.: US 12,249,821 B2
(45) Date of Patent: Mar. 11, 2025

(54) PLUG-ON SERVICE-ENTRANCE NEUTRAL DEVICE

(71) Applicant: Schneider Electric USA, Inc., Andover, MA (US)

(72) Inventors: Steven Wayne Dozier, Andover, MA (US); Charles Wesley Travis, Jr., Andover, MA (US); Xavier Lifran, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 233 days.

(21) Appl. No.: 18/015,881

(22) PCT Filed: Jul. 23, 2021

(86) PCT No.: PCT/US2021/043059
§ 371 (c)(1),
(2) Date: Jan. 12, 2023

(87) PCT Pub. No.: WO2022/020771
PCT Pub. Date: Jan. 27, 2022

(65) Prior Publication Data
US 2023/0369832 A1  Nov. 16, 2023

Related U.S. Application Data

(60) Provisional application No. 63/055,927, filed on Jul. 24, 2020.

(51) Int. Cl.
*H02G 5/00* (2006.01)
*H02B 1/01* (2006.01)
(Continued)

(52) U.S. Cl.
CPC ............. *H02G 5/007* (2013.01); *H02B 1/012* (2013.01); *H02B 1/04* (2013.01); *H02B 1/056* (2013.01);
(Continued)

(58) Field of Classification Search
CPC .......... H02B 1/012; H02B 1/04; H02B 1/056; H02B 1/20; H02B 1/26; H02B 1/306;
(Continued)

(56) References Cited

U.S. PATENT DOCUMENTS 4,000,444 A * 12/1976 Douglas ................... H02H 3/33
361/87
7,508,653 B2 * 3/2009 Parlee ..................... H02B 1/205
361/636

(Continued)

OTHER PUBLICATIONS

International Search Report and Written Opinion mailed Nov. 30, 2021 in corresponding International Application No. PCT/US2021/043059, 11 pages.

*Primary Examiner* — William H. Mayo, III
*Assistant Examiner* — Rhadames Alonzo Miller
(74) *Attorney, Agent, or Firm* — Troutman Pepper Locke LLP (57) ABSTRACT

A service-entrance plug-on neutral (SEPON) device having a conductive neutral sled having a line sled side and a load sled side configured to electrically couple with a neutral bus of a bus assembly of a switchboard or panelboard when the SEPON device is installed on the bus assembly; a lug assembly having one or more electrically conductive terminal lugs configured to receive line neutral current from an external source and to electrically couple to the line sled side; a movable neutral disconnect link movable into a connection position to establish electrical continuity between the line sled side and the load sled side and into a disconnection position to cause a discontinuity between the (Continued)

line sled side and the load sled side; and a main bonding jumper having first mounted to the line sled side and a second ends configured to be moved between a non-connected position and a ground position.

20 Claims, 8 Drawing Sheets

(51) Int. Cl.
  *H02B 1/04* (2006.01)
  *H02B 1/056* (2006.01)
  *H02B 1/20* (2006.01)
  *H02B 1/30* (2006.01)
  *H02B 1/32* (2006.01)
  *H02B 1/36* (2006.01)
  *H02B 3/00* (2006.01)
  *H02G 5/06* (2006.01)

(52) U.S. Cl.
  CPC .............. *H02B 1/20* (2013.01); *H02B 1/306* (2013.01); *H02B 1/32* (2013.01); *H02B 1/36* (2013.01); *H02B 3/00* (2013.01); *H02G 5/06* (2013.01)

(58) Field of Classification Search
  CPC ... H02B 1/32; H02B 1/36; H02B 3/00; H02G 5/007; H02G 5/06
  See application file for complete search history.

(56) References Cited

U.S. PATENT DOCUMENTS

| 2002/0187682 | A1  | 12/2002 | Lincoln, III et al. |
| 2011/0002089 | A1* | 1/2011  | Sharp ................... H02B 1/056 361/673 |
| 2011/0310534 | A1  | 12/2011 | Cosley et al. |
| 2016/0141134 | A1* | 5/2016  | Pearson ................ H01H 9/20 200/50.21 |
| 2017/0076896 | A1* | 3/2017  | Robinson .............. H01R 13/18 |
| 2017/0358416 | A1  | 12/2017 | Kamor et al. |
| 2023/0261445 | A1* | 8/2023  | Dozier ................... H02B 1/20 361/627 |
| 2023/0283052 | A1* | 9/2023  | Kulkarni ................ H02B 1/30 361/624 |

* cited by examiner

PLUG-ON SERVICE-ENTRANCE NEUTRAL DEVICE

TECHNICAL FIELD

The present disclosure relates to energy management, and more particularly, to a plug-on service entrance neutral device.

BACKGROUND

Conventional factory-assembled switchboards or panelboards typically come in a relatively limited number of configurations, and generally such factory assembled switchboards or panelboards require a significant amount of electrical buses, usually made of copper, which can be very expensive. A fully assembled switchboard or panelboard can also be very large and very heavy, which means shipping to the job site can be expensive and maneuvering to its final location at the job site can be very difficult. A completely assembled switchboard or panelboard can also be more difficult for installers to wire since some components block or restrict areas of the switchboard or panelboard where electrical connections must be made, such as toward the rear of the switchboard or panelboard.

Bus assemblies (also referred as a stack) for switchboards and panelboards can include parallel, adjacent, and spaced apart phase buses. Circuit breakers can be connected to the buses of the switchboard or panelboard via plug-on connectors that make a secure, electrical connection. The plug-on capability has provided certain advantages relative to other configurations, however even so, a neutral bus of a bus assembly is located separate from the phase buses of the bus assembly, such as off to the side or in a rear section of the switchboard or panelboard. In such configurations, neutral connections are off to the side or in the rear section, both of which make it difficult to access. A lack of clear access can reduce safety, such as by impeding access to a neutral disconnecting link or making such access hazardous, e.g., due to live bussing.

An external source, such as a utility company, provides main phase line current and an associated main neutral line current. The main phase line current is provided to a main breaker, via which the phase source inputs are electrically coupled to phase busses of the bus assembly. The main neutral line current can be provided to a neutral device via which the main neutral line current is electrically conducted to a neutral bus of the bus assembly. The neutral bus may be disposed in a rear or side area of the switchboard or panelboard that is remote from the phase buses and main breaker. This neutral device must satisfy certain requirements for safety and for satisfying regulatory certification requirements.

These requirements can include providing a disconnect capability for disconnecting from the neutral bus (e.g., when maintenance is performed), an ability to transition a main bonding jumper between a connection to ground and a connection to the neutral bus of the bus assembly at installation, and an ability to monitor current on the neutral bus and communicate an overcurrent condition to the main breaker.

When the neutral bus is remote from the phase buses, such as located in a rear section of the switchboard, access to the neutral device, such as for disconnecting from the neutral bus or changing a main bonding jumper to or from a ground connection, can be difficult and risky due to live phase buses in a service entrance area of the switchboard that can interfere with access to the neutral device. Additionally, the main breaker can be disposed in the service entrance area of the switchboard that is remote from this neutral device, such that lengthy cabling is used for communicating overcurrent conditions from this neutral device to the main breaker.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a service-entrance plug-on neutral (SEPON) device. The SEPON device includes a neutral sled mounted to a frame of the SEPON device. The neutral sled is conductive and has a load sled side and a line sled side. The load sled side is configured to electrically couple with a neutral bus of a bus assembly of a switchboard or panelboard when the SEPON device is installed on the bus assembly. The SEPON device further includes a lug assembly, a neutral disconnect link, and a main bonding jumper. The lug assembly has one or more terminal lugs, wherein each terminal lug is electrically conductive, is configured to receive line neutral current from an external source, and is electrically coupled to the line sled side. The neutral disconnect link is movable into a connection position to establish electrical continuity between the line sled side and the load sled side and into a disconnection position to cause a discontinuity between the line sled side and the load sled side. The main bonding jumper has first and second ends, wherein the first end is mounted to the line sled side and the second end is configured to be moved between a non-connected position and a position connected to ground. The SEPON device is configured to be installed on the bus assembly as a single module with the load sled side in physical contact and electrical communication with the neutral bar.

In one or more embodiments, the SEPON device can be configured to be installed on the bus assembly by sliding the neutral sled to cause the load sled side to make physical contact and establish electrical connection with the neutral bus. The SEPON device can further include a fastening device configured to secure the electrical coupling.

In one or more embodiments, the SEPON device can further include a phase cooperation portion configured to physically cooperate with the two or more phase buses of the bus assembly when the SEPON device is installed on the bus assembly, wherein the phase cooperation portion can be electrically isolated from the two or more phase buses and can include spacers configured to be inserted within a gap between the two or more phase buses and to provide electrical insulation between the two or more phase buses.

In one or more embodiments, the lug terminal can be accessible from the service entrance portion for establishing a physical and electrical connection with the external line neutral to receive the line neutral current.

In one or more embodiments, the neutral disconnect link can be further accessible from the service entrance portion for moving the neutral disconnect link between the first and second positions.

In one or more embodiments, the main bonding jumper can be further accessible from the service entrance portion for moving the main bonding jumper between the connected and non-connected positions.

In one or more embodiments, each of the load sled side and the line sled side can have an elongated section and a perpendicular section, the elongated sections of the load sled side and the line sled side being can be parallel to each other, and the perpendicular sections can be oriented perpendicular to the elongated sections and parallel to each other and spaced by a gap. The neutral disconnect link can be configured to be removably inserted within the gap for completing the continuous electrical path, and to be removed for disrupting the continuous electrical path.

In one or more embodiments, the SEPON device can further include a current transformer (CT) disposed in relation to the neutral sled and configured to sense current that flows through the neutral sled and output an output signal that corresponds to the sensing.

In one or more embodiments, the SEPON device can further include a plug coupled to the CT for receiving the output signal, the plug having a first mating interface that is configured to mate with a second mating interface for outputting the output signal to a ground fault detection and/or interrupter circuit that is external to the SEPON device.

In accordance with a further aspect of the disclosure, a switchboard or panelboard assembly is provided that includes a bus assembly disposed interior to a switchboard or panelboard. The bus assembly includes a phase portion having one or more parallel phase buses and a neutral bus adjacent to the phase portion and oriented parallel to the phase buses. The SEPON device is configured to be installed on the bus assembly.

In accordance with a further aspect of the disclosure, a method of installing a SEPON device on a bus assembly of a switchboard or panelboard is provided. The method includes sliding the SEPON device as a single module into a position for physical contact between a load sled side of a neutral sled of the SEPON device and a neutral bus of the bus assembly, wherein the neutral sled is electrically conductive and configured for electrical communication with the neutral bus via the physical contact. The method further includes coupling a neutral line input conductor from an external source to one or more terminal lugs, wherein the one or more terminal lugs are electrically conductive, are configured to receive a line neutral current from the neutral line input conductor, and are electrically coupled to a line sled side of the neutral sled. The method further includes inserting or removing a neutral disconnect link from a position between the line sled side and the load sled side of the neutral sled for establishing or disrupting, respectively, electrical continuity between the line sled side and the load sled side, and positioning a main bonding jumper in a non-connected position for connecting only to the neutral sled or a connected position electrically coupling the neutral bus to ground.

In one or more embodiments, the method further includes accessing the SEPON device via a front a service entrance of the switchboard or panelboard, securing the SEPON device to the bus assembly with a fastening device, and securing at least one of the neutral disconnect link in the position between the line sled side and the load sled side and the main bonding jumper in the connected position or non-connected position.

In one or more embodiments, sliding the SEPON device can include inserting spacers of the SEPON device between two or more phase buses of the bus assembly. In addition, the method can further include accessing the SEPON device via a front a service entrance of the switchboard or panelboard and securing the SEPON device to the bus assembly with a fastening device that can cause compression between the load sled side and the neutral bus and compression between one or more phase buses, wherein physical and electrical contact of the one or more phase buses can be blocked by the inserted spacers.

In one or more embodiments, the SEPON device can be installed adjacent to and below a main breaker that is installed on the bus assembly. A position occupied by the installed SEPON device can previously have been occupied by a different type of modular device, or the method can further include uninstalling the SEPON device, wherein the position occupied by the previously installed SEPON device can be available for use by the different type of modular device.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

Identical reference numerals have been used, where possible, to designate identical elements that are common to the figures. However, elements disclosed in one embodiment may be beneficially utilized on other embodiments without specific recitation.

DETAILED DESCRIPTION

The present disclosure provides a plug-on service-entrance neutral (SEPON) device and SEPON kit for a switchboard or panelboard, including the I-Line™ series of switchboards or panelboards from Schneider Electric USA, Inc. that enables flexible and modular assembly and installation of the SEPON device with the switchboard or panelboard. The SEPON device can be assembled and/or installed using a single kit.

The SEPON device is configured to be installed on a bus assembly (also referred to as a stack) of the switchboard or panelboard, and in particular at a service entrance area of the board (meaning switchboard or panelboard) to a neutral bus of the bus assembly when the neutral bus is disposed next to the phase buses of the bus assembly. The SEPON device and SEPON kit are designed to reduce or minimize the amount of time and skill needed to perform this installation using ordinary mechanical assembly skills, without the need for particular electrical technician skills. The SEPON device is configured to be slid into position and secured to the bus assembly for providing an electrical path via which the neutral bus can receive a main neutral line current from an external source, such as a utility company. The main neutral line current is associated with main phase line current from the external source that is received by a main breaker via an electrical connection to the phase buses. The SEPON device can be disposed in the service entrance area proximate the main breaker, such as adjacent to and below the main breaker.

The board is configured with the neutral bus located next to the phase buses and accessible via the service entrance area. When the neutral bus is accessible via service entrance area, installation of the SEPON device can be performed by sliding the SEPON in position as a single modular device and securing it in place with clear access to the neutral bus available via the service entrance area. A nonconductive barrier can be provided that electrically isolates a portion of the service entrance area, such as a portion below main breaker. This isolated portion is substantially electrically isolated from the phase buses and main breaker, which enhances safety to persons installing the SEPON device or providing maintenance to the board via the SEPON device. Disconnection of the SEPON device can be performed via safe access to the service entrance area. Transitioning a main bonding jumper to or from a ground connection can be performed via safe access to the service entrance area. The SEPON device is disposed proximate the main breaker. A small wire can be coupled between the SEPON device and the main breaker disposed directly above the SEPON device that can communicate an amount of current sensed by the SEPON device to ground fault monitoring circuitry of the main breaker, reducing an amount of cable that would be needed if the SEPON device were disposed remote from the main breaker.

The SEPON device is exchangeable with a different modular device, such as a modular splice assembly for connecting two switchboards. By merely exchanging the modular device, e.g., the modular splice assembly, with the SEPON device, or vice versa, a board can transition between different configurations, such as from a configuration for a group mounted distribution section having a bus bridge to a service entrance area having a main breaker. When installed, SEPON device provides the board with main neutral lug connections that are directly integrated with the bus assembly, rather than off to the side of bus assembly or in a rear of the board. Access to the main neutral lug connections is improved when provided by the SEPON device at the service entrance area, which improves safety, provides clear access to a neutral disconnecting link, and provides protection from live bussing by the integrated nonconductive barrier.

Figure 1:
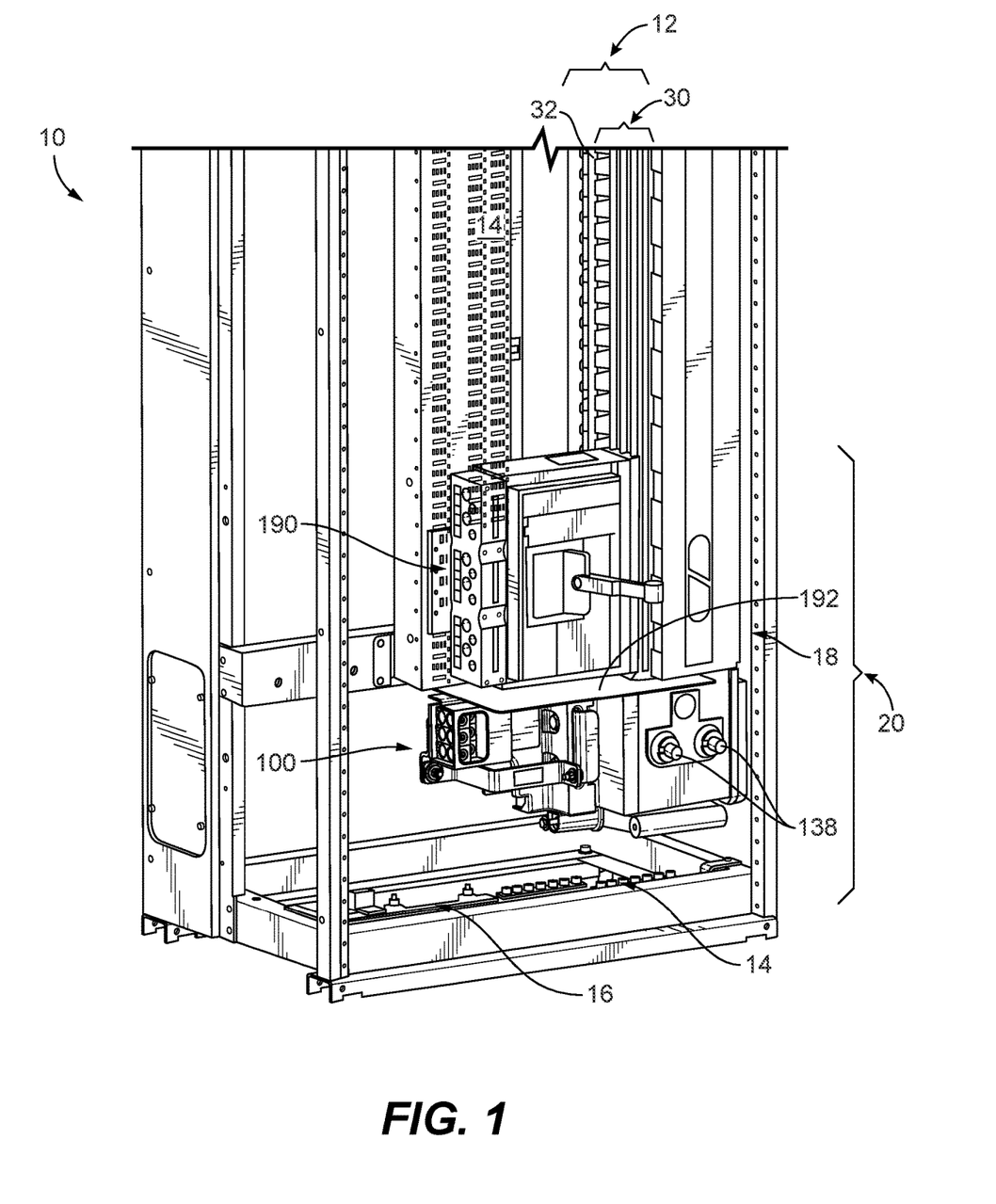
FIG. 1 shows a side, perspective view of an example service-entrance plug-on neutral (SEPON) device disposed in an interior area of a switchboard installed on a bus assembly and breaker support frame disposed within the switchboard and in proximity of an installed main breaker, in accordance with embodiments of the disclosure.

With reference to FIG. 1, shown is a side, perspective view of an example SEPON device 100 disposed in a service entrance area 20 of a switchboard 10, installed on a bus assembly 12 and breaker support frame 14 disposed within switchboard 10. Switchboard 10 shown in the figures (namely FIGS. 1 and 2) is shown as an example. The disclosure applies as well to a panelboard. All references and illustrations of a switchboard are equally relevant to a panelboard. SEPON device 100 is installed adjacent to and below a main breaker 190 that is also installed to bus assembly 12 within the service entrance area 20, with a nonconductive barrier 192 disposed between SEPON device 100 and main breaker 190. Nonconductive barrier 192 can electrically isolate SEPON device 100 from main breaker 190, albeit with an opening for passage of a small wire via which SEPON device 100 can send output signals (such as signaling detection of an overcurrent condition) to main breaker 190. The service entrance area 20 refers to a front area of switchboard 10 that is most accessible. Components disposed behind the service entrance area 20 and at or towards the rear of the switchboard 10 are more difficult to access, particularly when the switchboard is wall-mounted, such that the rear face of the switchboard as juxtaposed to a wall.

Switchboard 10 includes a frame 18. Disposed within frame 18 is bus assembly 12, which includes parallel phase and neutral buses, which in the example shown include phase buses 30A-30C (referred to collectively as phase buses 30) and neutral bus 32. Bus assembly 12 and SEPON device 100 are configured for plug-on connections in which SEPON device 100 plug-on to neutral bus 32 for a secure, electrical connection, such as provided by the I-Line™ series of switchboards or panelboards from Schneider Electric USA, Inc. Similarly, main breaker 190 is configured for plug-on connections to phase buses 30 for a secure, electrical connection.

The term "electrical connection" refers to coupling of conductive elements through which electricity can flow via the coupling. The electrical connection can be established before current is applied. The electrical connection provides a path for the current to traverse once the current is applied.

Phase buses 30, neutral bus 32, and breaker support frame 14 can all be parallel to one another and oriented vertically or horizontally and disposed interior to switchboard 10 at a front section of switchboard 10, and extend to the service entrance area 20. A nonconductive material 34 is disposed in between each of the phase buses 30 as well as between phase bus 30C and neutral bus 32 for providing electrical insulation. Switchboard 10 further includes a ground portion 14 having a ground connector 16, such as a ground bus bar.

Figure 2:
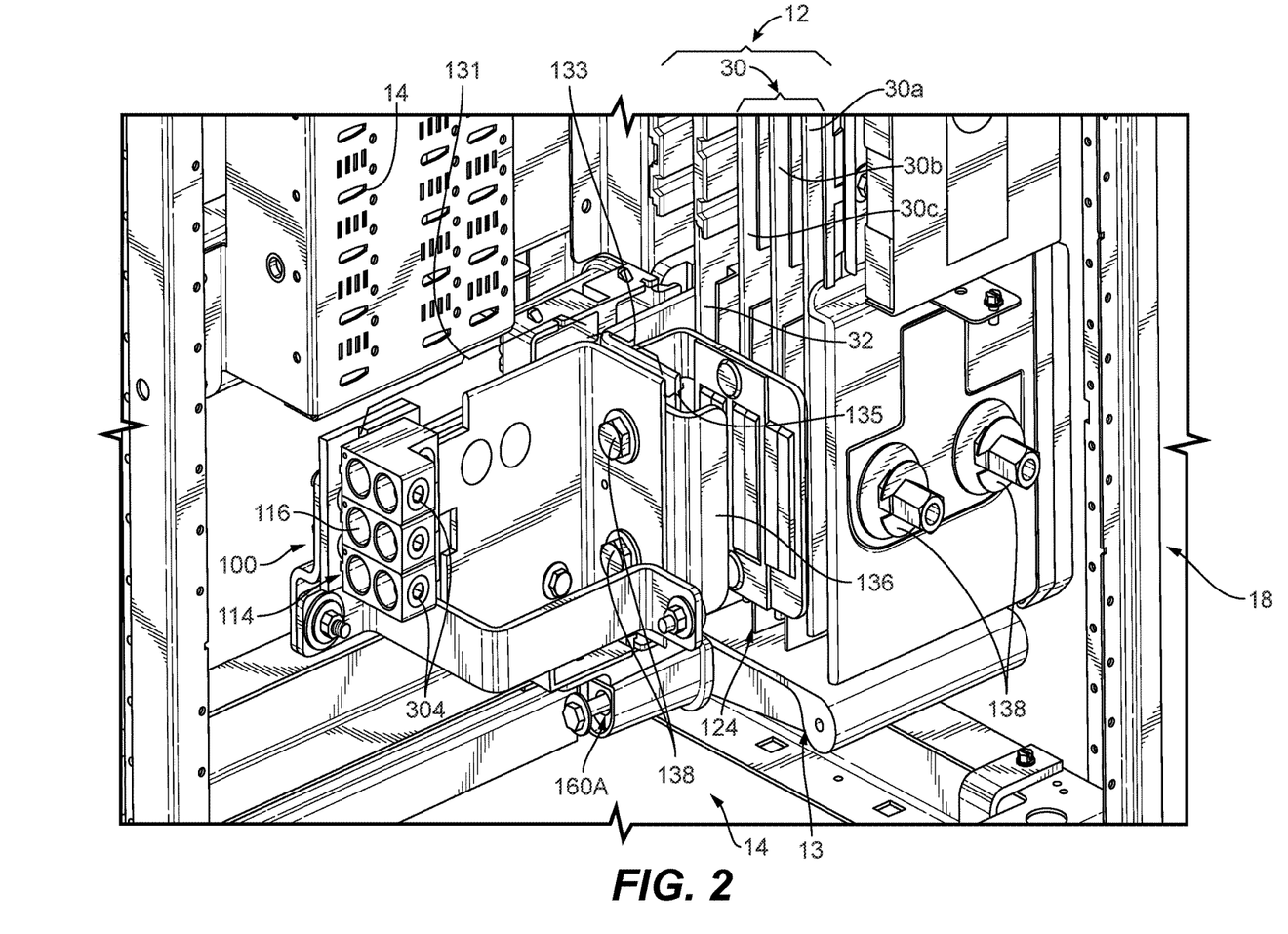
FIG. 2 shows a side, perspective view of the installed SEPON device shown in FIG. 1 in closer detail, with a portion of the SEPON's housing shown as transparent or removed in accordance with embodiments of the disclosure.
Figure 3:
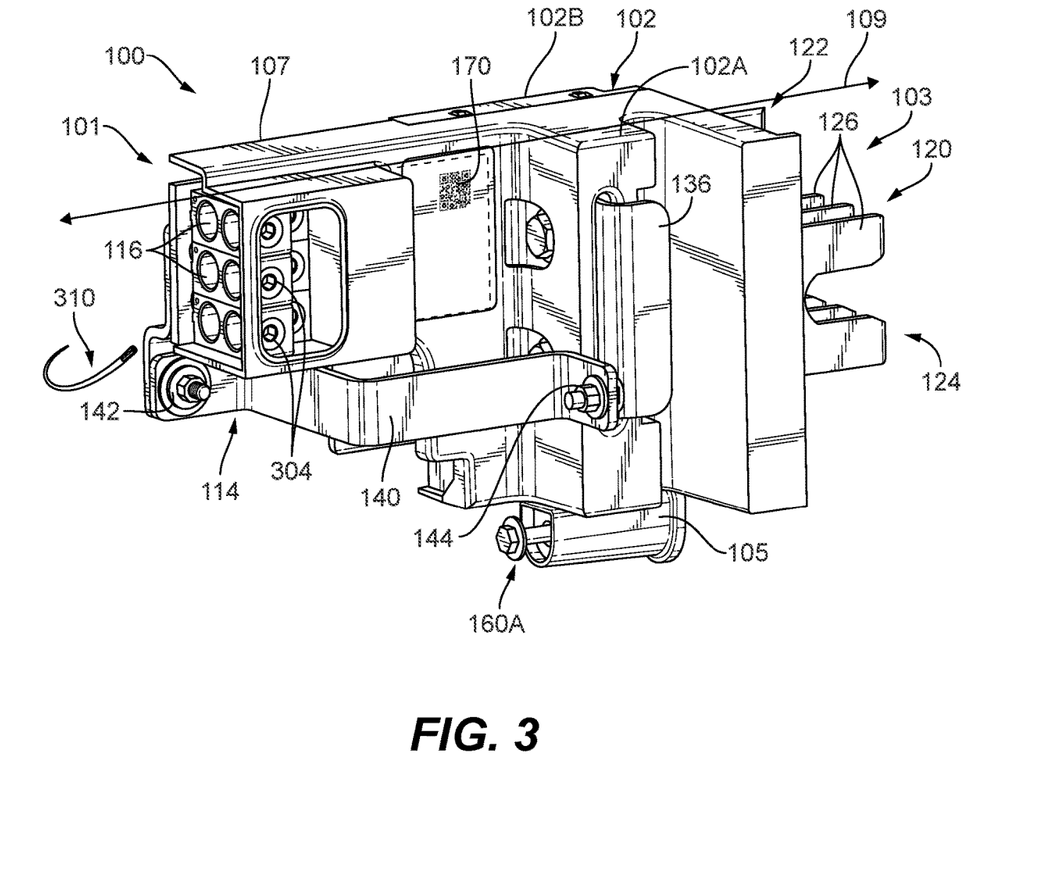
FIG. 3 shows a side, perspective view of an example SEPON device, in accordance with embodiments of the disclosure.
Figure 4:
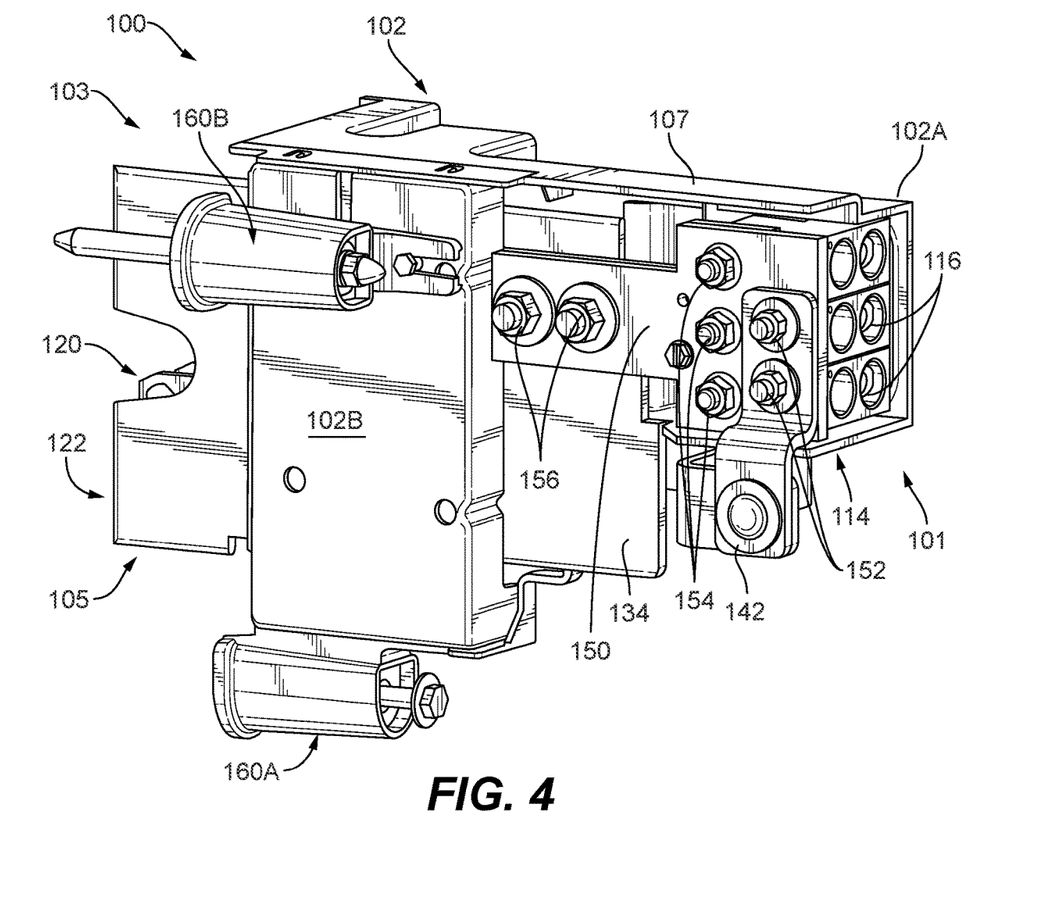
FIG. 4 shows an opposing-side, perspective view of the SEPON device shown in FIG. 3, in accordance with embodiments of the disclosure.

With reference to FIGS. 2-4, SEPON device 100 has a frame, such as housing 102, without limitation to a particular type of frame. Housing 102 includes a near side housing portion 102A, a far side housing portion 102B, wherein near and far sides are relative to the position of neutral sled 130. Far side housing portion 102B extends the length of SEPON device 100 from a source end 101 to a bus end 103. A longitudinal axis extends from source end 101 to bus end 103 and is oriented perpendicular to neutral bar 32 and phase bars 30 when SEPON device 100 is installed on bus assembly 12. SEPON device 100 further includes a lug assembly 114, a neutral sled 130, a neutral disconnect link 136, and a main bonding jumper 140.

FIG. 2 shows a side, perspective view of an example SEPON device 100 installed on bus assembly 12 with the first housing portion 102A shown as being transparent or removed. FIG. 3 shows a side-perspective view of an example SEPON device 100. FIG. 4 shows an opposing-side perspective view of the example SEPON device 100 shown in FIG. 3.

Housing 102 has a source end 101 at its rear and a bus end 103 at its front. Lug assembly 114 can be housed in first housing portion 102A, which defines lug apertures 116, each lug aperture 116 being configured to receive a neutral line input conductor 310 that conducts a main neutral line current from an external line source, such as a utility company providing electrical power to switchboard 10. Lug assembly 114 includes terminal lugs 304 that are secured interior to first housing portion 102A, without limitation to a particular structure for securing terminal lugs 304 in SEPON device 100. When received, neutral line input conductor 310 is electrically coupled to a terminal lug 304. Neutral line input conductor 310 is received within lug apertures 116 and secured to one or more terminal lugs 304. Each terminal lug 304 is electrically conductive and configured to receive the main neutral line current from the neutral line input conductor 310. Lug assembly 114 can be mounted to neutral sled 130 and terminal lugs 304 are electrically coupled to neutral sled 130.

Bus end 103 of housing 101 is provided with phase cooperation portion 120. Phase cooperation portion 120 is configured to physically cooperate with phase buses 30A-30C and to physically stabilize SEPON device 100 when installed on bus assembly 12. Phase cooperation portion 120 includes a spacer assembly 124 that includes spacers 126 that are formed of a nonconductive material and configured to be inserted in between phase buses 30 when SEPON device is installed on bus assembly 12 to electrically isolate phase buses 30 from one another even when compressed towards one another. Accordingly, phase cooperation portion 120 provides electrical isolation between phase buses 30A-30C when SEPON device 100 is installed.

Neutral sled 130 is positioned parallel to longitudinal axis 109 and is disposed at the near side of SEPON device 100. Neutral sled 130 includes a load sled side 132 and a line sled side 134. Load sled side 132 is configured to be electrically coupled to neutral bar 132 when SEPON device 100 is slid into position for installation on bus assembly 12. Line sled side 134 is electrically coupled to terminal lugs 304. Terminal lugs 304 are electrically coupled to neutral line input connector 310 and thus the line source. Line sled side 132 and load sled side 134 are configured to be selectively electrically coupled. When line sled side 132 and load sled side 134 are electrically coupled, load sled side 132 is electrically coupled to neutral line input connector 310 and conducts the main neutral line current to neutral bus bar 32.

Secure physical contact for establishing electrical connection between load sled side 132 and neutral bus 32 is enhanced and/or provided by applying compression between load sled side 132 and neutral bar 32. Compression can be applied, for example, by first hardware fasteners 138 of bus assembly 12, e.g., without limitation to a particular structure or method of applying compression. First hardware fasteners 138 can include, for example, bolts, clamps, clips, etc.

Each of load sled side 132 and line sled side 134 has an elongated section 131 that is oriented parallel to longitudinal axis 109 and a perpendicular section 133 that is oriented perpendicular to longitudinal axis 109. Elongated sections 131 and perpendicular sections 133 are generally flat. Perpendicular sections 133 of the respective load sled side and line sled side are oriented parallel to each other and spaced by a gap 135.

Neutral disconnect link 136 can be inserted into gap 135 and extend from a near side of SEPON device 107 to a far side 105 of SEPON device 100 for establishing electrical continuity between load sled side 132 and line sled 134, which forms a continuous electrical path via neutral sled 130 from terminal lugs 304 to neutral bar 32. When removed, neutral disconnect link 136 electrically disconnects line sled side 134 from load sled side 132.

Neutral disconnect link 136 can be configured as generally flat for sliding into gap 135 and for fitting snugly within gap 135. Neutral disconnect link 136, which is generally flat, makes physical contact along both perpendicular sections 133 of each of load sled side 132 and line sled 134, which provides an electrical connection between load sled side 132 and line sled side 134. When neutral disconnection link 136 is removed, there is a void in gap 135, which disrupts electrical continuity between load sled side 132 and line sled side 134.

SEPON device 100 is configured to be installed on bus assembly 12 as a single module. SEPON device 100 can be slid into position for load sled side 132 to make physical contact with the neutral bar 32. In this way, a continuous electrical path is established from terminal lugs 304 to neutral bar 32, via neutral sled 130, providing a path for main neutral line current received by any of the terminal lugs when neutral disconnect link 136 is inserted in gap 135.

Removable second hardware fasteners 139, e.g., bolts, pins, clamps, or clips, can hold neutral disconnect link 136 snugly in its inserted position for enhancing electrical connection between load sled side 132 and line sled 134. When second hardware fasteners 139 are removed, neutral disconnect link 136 can be removed from its inserted position, causing electrical discontinuity between terminal lugs 304 and load sled side 132. In the example shown, neutral disconnect link 136 can be slid into an inserted position and slid out of its inserted position.

Main bonding jumper 140 is electrically conductive and is rotatably coupled at a first end to the neutral sled 130 using a third hardware fastening device 142, such as a bolt, pin, clip, clamp, etc. Main bonding jumper 140 can move between a connected and non-connected position, such as by pivoting about third hardware fastening device 142. When in the non-connected position, a second end of the main bonding jumper 140 is free and is not coupled to any component. When in the connected position, the second end of the main bonding jumper 140 is removably coupled by fourth hardware fastening device 144 to a ground connector 16, forming electrical communication between neutral sled 30 and ground connector 16. Main boding jumper 140 can be moved from the connected position to non-connected second position, or can be moved from the non-connected position to the connected position.

Second and fourth hardware fastening devices 139 and 142, which are configured to be used for manipulating neutral disconnect link 136 and securing main bonding jumper 140, respectively, during or after installation, are all accessible from the front of service entrance area 20, which is provided at the front of switchboard 10, without hindrance by other components of switchboard 10 and without exposing a person installing or maintaining SEPON device 100 to any live current, such as current traversing a phase bus. Furthermore, neutral sled 130 and components that provide electrical continuity between terminal lugs 304 and neutral sled 130 are located at the near side 107 of SEPON device 100, and thus do not interfere with access to neutral disconnect link 136, main bonding jumper 140, or second and fourth hardware fastening devices 139 and 142, each of which are configured to be used for manipulating neutral disconnect link 136 or main bonding jumper 140. As shown, neutral sled 130 is generally flat, including live sled side 134 and load sled side 132.

With reference to FIG. 4, an electrically conductive local neutral bus bar 150 is shown behind the near side 107 of SEPON device 100 that can be used for mounting main bonding jumper 140 and providing electrical continuity between sled 130 and main bonding jumper 140. As shown, neutral sled 130 is generally flat, including live sled side 134 and load sled side 132. Local neutral bus bar 150 is also generally flat and lays flat against line sled side 134 for establishing the electrical connection. Hardware mounting fasteners 160A and 160B are shown, which can be fastening devices, such as bolts, pins, clamps, or clips. First SEPON device 100 is slid and/or plugged as a singular modular device into position, after which SEPON device 100 is secured to a frame 13 of bus assembly 12 via, for example, hardware mounting fasteners 160A and 160B. All of the hardware fasteners needed for securing SEPON device 100 can be provided together with the SEPON device 100 itself with a SEPON kit.

The kit can include the SEPON device 100, the various hardware fasteners (e.g., correct number, diameter, length, thread pitch and gauge of hardware 112), and access installation instructions (e.g., a list of contents of the SEPON kit, installation instructions, and/or augmented reality to show an assembler, in an approved and certified sequence, where each component of the SEPON device 100 is to be installed). If needed for certification purposes, a special torque wrench can be used when installing the hardware fasteners, such as for achieving a predetermined torque and/or storing a measurement of the torque applied, e.g., for meeting certification requirements. An installer can operate a computing device to read an optical code 170 to access the stored installation instructions and to access storage for storing installation information, such as the torque information.

Figure 5:
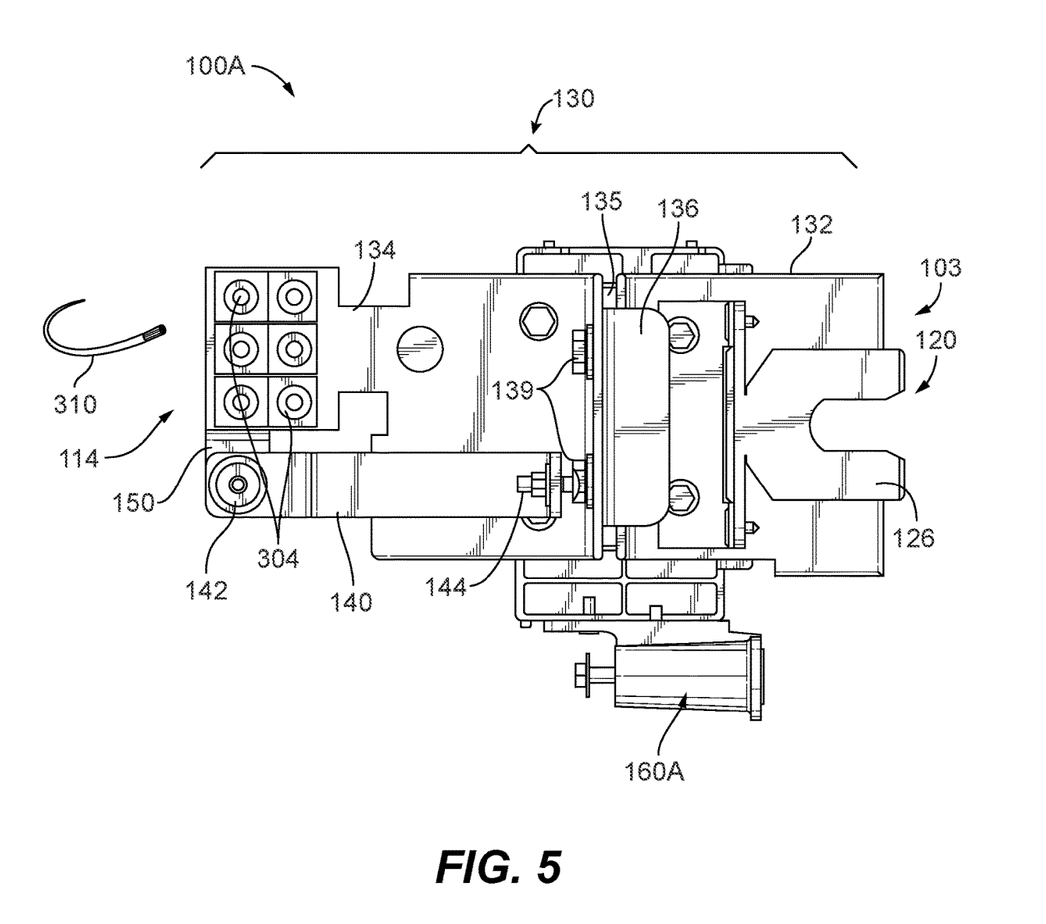
FIG. 5 shows a side view of a low-ampacity SEPON device, with portions of its housing shown as transparent or removed, in accordance with embodiments of the disclosure.

With reference to FIG. 5, an embodiment of an example low-ampacity SEPON device 100A is shown. FIG. 5 shows a side view of low-ampacity SEPON device 100A with portions 102A and 102B of housing 102 shown as transparent or removed. SEPON device 100A has up to a first quantity of lug apertures 116 in lug assembly 114 for receiving main neutral line current from the first quantity of neutral source input conductors 310, wherein each neutral source input conductor 310 has a particular amperage and provides a main line source current that corresponds to a set of main phase source input conductors (not shown) connected to main breaker 190. SEPON device 100A, when configured based on the low-ampacity embodiment, has ampacity that is limited to below a first threshold, such as 570 amps or 250 amps. Current received by SEPON device 100A from the first quantity of neutral source input conductors 310 is maintained below the first threshold. In accordance with good practice and/or compliance with regulations, current monitoring is not required when maintained below the first threshold.

Figure 6:
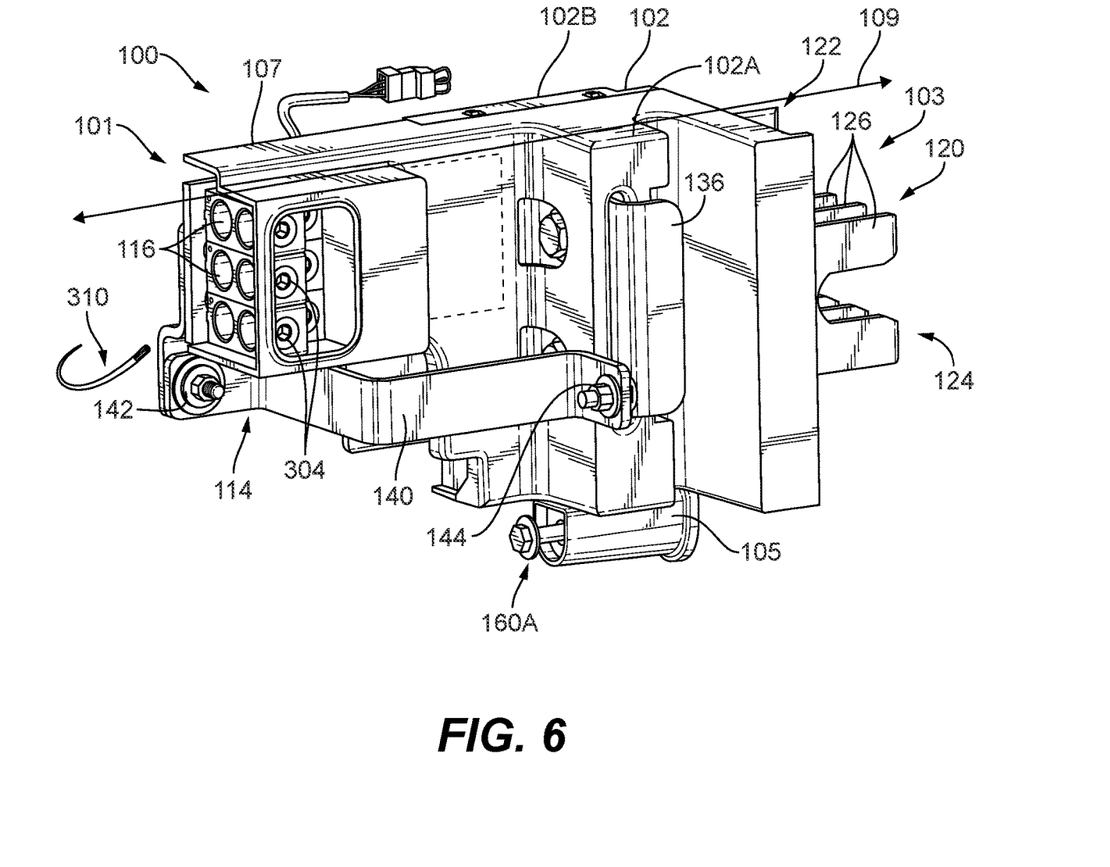
FIG. 6 shows a side perspective view of an embodiment of an example high-ampacity SEPON device, in accordance with embodiments of the disclosure.
Figure 7:
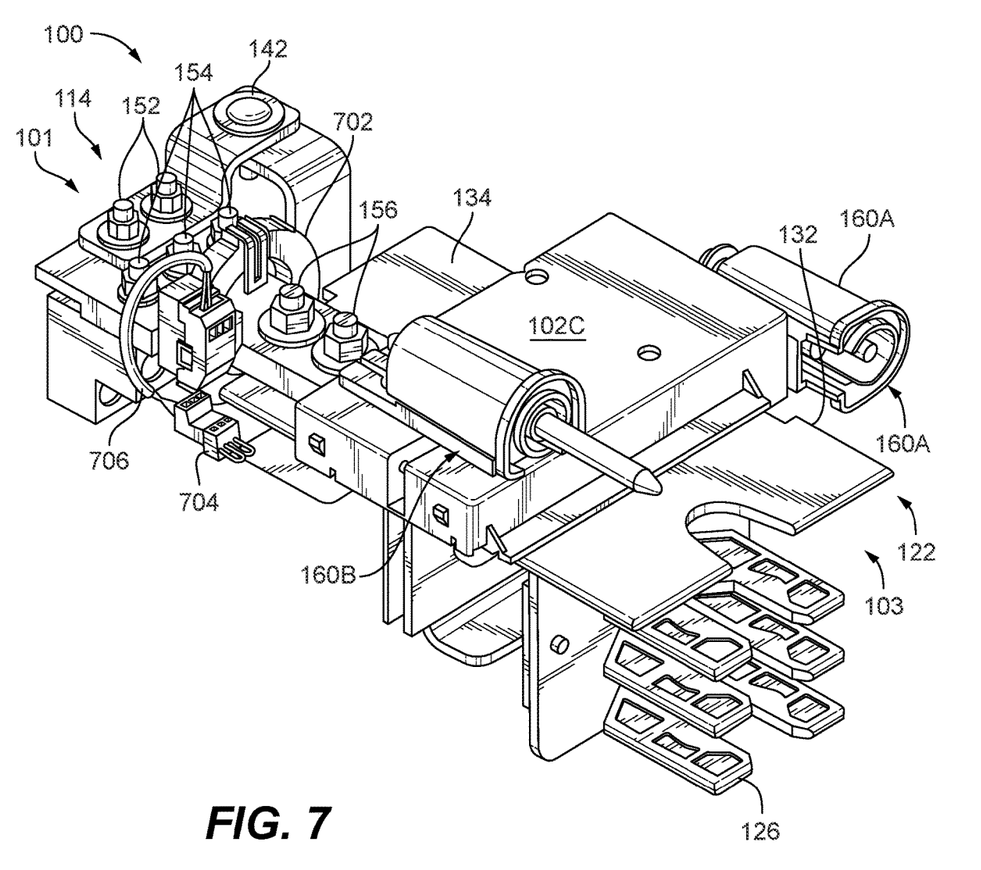
FIG. 7 shows an opposing-side perspective view of the SEPON device shown in FIG. 6, with portions of its housing shown as transparent or removed, in accordance with embodiments of the disclosure.
Figure 8:
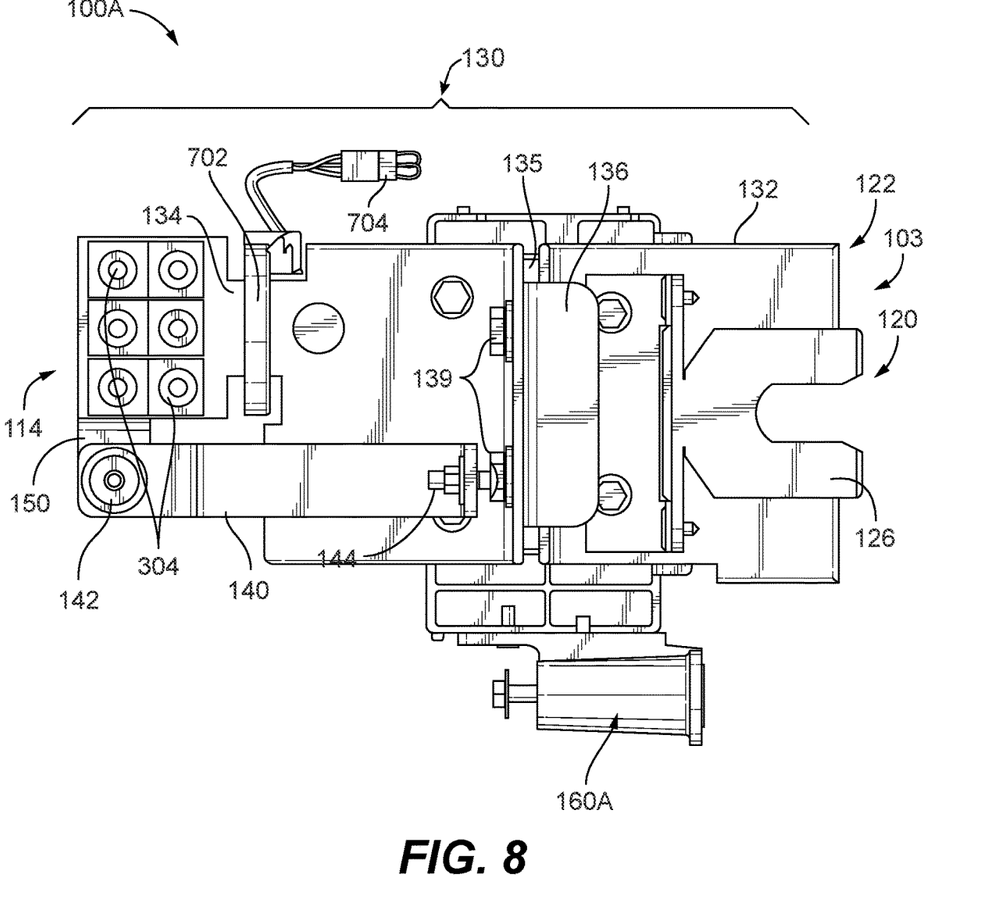
FIG. 8 shows a side view of a high-ampacity SEPON device, with portions of its housing shown as transparent or removed, in accordance with embodiments of the disclosure.

With reference to FIGS. 6 and 7, an embodiment of an example high-ampacity SEPON device 100B is shown. FIG. 6 shows a side, perspective view of high-ampacity SEPON device 100B and FIG. 7 shows an opposing-side perspective view of the high-ampacity SEPON device 100 shown in FIG. 6, with portions 102A and 102B of housing 102 shown as transparent or removed. SEPON device 100B has up to a second quantity of lug apertures 116 in lug assembly 114 for receiving main neutral line current from up to the second quantity of neutral source input conductors 310, wherein each neutral source input conductor 310 has a particular amperage and corresponds a set of phase source input conductors (not shown) connected to main breaker 190. SEPON device 100B, when configured based on the high-ampacity embodiment, has ampacity that is limited to below a second threshold, such as 1600 amps.

In accordance with good practice and/or compliance with regulations, current monitoring is required, and it is required to provide an output signal that represents measured current. A trip device in main breaker 190 can receive the output signal and determine whether the measured current represented by the output signal exceeds a current threshold (indicating an occurrence of an overcurrent condition) and trigger a trip, e.g., to open circuit, to prevent current flow.

Accordingly, as shown in FIG. 7, a current transformer (CT) 702 is provided for monitoring current through load sled side 132 and outputting an output signal that indicates the measured current. CT 702 can be placed around neutral sled 30. In the example shown, CT 702 is shaped as a toroid that surrounds load sled side 132. The output signal can be output, for example, to a plug 704 via one or more wires 706 that provide an electrical connection between CT 702 and plug 704.

Plug 704 can have a first mating interface that is configured to mate with a second mating interface for outputting the output signal, e.g., to a ground fault detection and/or interrupter circuit that is external to SEPON device 100. In the example shown, a second mating interface (second mating interface 194 shown in FIG. 1) is provided on main breaker 190, or alternatively is integrated with bus assembly 12 and also physically and electrically connects with an electrical connector of main breaker 190. Main breaker 190 receives the output signal via second mating interface 194, and can trigger a trip when it is determined that a ground fault condition has occurred.

SEPON device 100 (including 100A or 100B) can be installed to or removed from bus assembly 12 while in the field, since the position in service entrance 20 of switchboard 10 at which SEPON device 100 is installed is readily accessible. SEPON device 100 is a modular device that can be interchanged with other types of modular devices that can be installed to the bus assembly 12 next to main breaker 190, such as a modular splice assembly. The other type of modular device can be installed on either side of main breaker 190, whereas SEPON device 100 can be installed to the side of main breaker 190 at which the neutral bus is provided, e.g., to the left side shown in FIG. 1. Installation of SEPON device 100 with main breaker 190 enables service entrance section 20 of switchboard 12 to change from being configured with a group mounted distribution section to being configured with main breaker 190.

SEPON device 100 (including 100A or 100B) is configured to receive main neutral line current via terminal lugs 116 at service entrance area 20 at the front of switchboard 12, instead of to the side or rear of switchboard 12, wherein improved access to SEPON device 100 is achieved by being positioned at the front of switchboard 12. Improved access is provided for each of lug apertures 116 for physically and electrically connecting neutral line input conductor 310, inserting or removing neutral disconnect link 136, and changing the position of main bonding jumper 140 between an un-connected position in which main bonding jumper is only coupled to neutral sled 130 and a connected position in which the main bonding jumper electrically couples neutral sled 30 to ground. In addition to improved ease of access, safety for accessing SEPON device 100 and its related couplings is improved by protection from live bussing on phase buses 30 by nonconductive barrier 192.

The SEPON kit can be assembled and installed by a person that lacks skills needed for assembly and installation in a conventional or other switchboard in which a neutral is installed remotely from the main breaker, is installed in the rear of the switchboard, and/or lacks modularity. The SEPON kit and switchboard 12 are configured so that SEPON kit includes every element needed for grounding, neutral disconnecting, and ground fault signaling (when ground fault signaling is required). All bussing for providing electrical continuity from terminal lugs 116 to neutral bar 32 is mounted on neutral sled 130, which can be slid into position and securely attached to bus assembly 12 using the hardware provided.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A service-entrance plug-on neutral (SEPON) device, comprising:
    a neutral sled mounted to a frame of the SEPON device, the neutral sled being conductive and having a load sled side and a line sled side, wherein the load sled side is configured to electrically couple with a neutral bus of a bus assembly of a switchboard or panelboard when the SEPON device is installed on the bus assembly;
    a lug assembly having one or more terminal lugs, each terminal lug configured to receive line neutral current from an external source, each terminal lug being electrically conductive and being electrically coupled to the line sled side;
    a movable neutral disconnect link that can be moved into a connection position to establish electrical continuity between the line sled side and the load sled side and into a disconnection position to cause a discontinuity between the line sled side and the load sled side; and
    a main bonding jumper having first and second ends, the first end being mounted to the line sled side and the second end being configured to be moved between a non-connected position and a position connected to ground,
    wherein the SEPON device is configured to be installed on the bus assembly as a single module with the load sled side in physical contact and electrical communication with the neutral bar.

2. The SEPON device of claim 1, wherein the SEPON device is configured to be installed on the bus assembly by sliding the neutral sled to cause the load sled side to make physical contact and establish electrical connection with the neutral bus, the SEPON device further comprising a fastening device configured to secure the electrical coupling.

3. The SEPON device of claim 1, further comprising a phase cooperation portion configured to physically cooperate with the two or more phase buses of the bus assembly when the SEPON device is installed on the bus assembly, wherein the phase cooperation portion is electrically isolated from the two or more phase buses and includes spacers configured to be inserted within a gap between the two or more phase buses and to provide electrical insulation between the two or more phase buses.

4. The SEPON device of claim 1, wherein the lug terminal is accessible from the service entrance portion for establishing a physical and electrical connection with the external line neutral to receive the line neutral current.

5. The SEPON device of claim 1, wherein the neutral disconnect link is further accessible from the service entrance portion for moving the neutral disconnect link between the first and second positions.

6. The SEPON device of claim 5, wherein the main bonding jumper is further accessible from the service entrance portion for moving the main bonding jumper between the connected and non-connected positions.

7. The SEPON device of claim 1, wherein each of the load sled side and the line sled side has an elongated section and a perpendicular section, the elongated sections of the load sled side and the line sled side being oriented parallel to each other, the perpendicular sections being oriented perpendicular to the elongated sections and parallel to each other and spaced by a gap, wherein the neutral disconnect link is configured to be removably inserted within the gap for completing the continuous electrical path, and to be removed for disrupting the continuous electrical path.

8. The SEPON device of claim 1, further comprising a current transformer (CT) disposed in relation to the neutral sled and configured to sense current that flows through the neutral sled and output an output signal that corresponds to the sensing.

9. The SEPON device of claim 8, further comprising a plug coupled to the CT for receiving the output signal, the plug having a first mating interface that is configured to mate with a second mating interface for outputting the output signal to a ground fault detection and/or interrupter circuit that is external to the SEPON device.

10. A switchboard or panelboard assembly comprising:
    a bus assembly disposed interior to a switchboard or panelboard, the bus assembly including a phase portion having one or more parallel phase buses and a neutral bus adjacent to the phase portion and oriented parallel to the phase buses;

a service-entrance plug-on neutral (SEPON) device configured to be installed on the bus assembly, the SEPON device comprising:
  a neutral sled mounted to a frame of the SEPON device, the neutral sled being conductive and having a load sled side and a line sled side, wherein the load sled side is configured to electrically couple with a neutral bus of the bus assembly when the SEPON device is installed on the bus assembly;
  a lug assembly having one or more terminal lugs, each terminal lug configured to receive line neutral current from an external source, each terminal lug being electrically conductive and being electrically coupled to the line sled side;
  a movable neutral disconnect link that can be moved into a connection position to establish electrical continuity between the line sled side and the load sled side and into a disconnection position to cause a discontinuity between the line sled side and the load sled side; and
  a main bonding jumper having first and second ends, the first end being mounted to the line sled side and the second end being configured to be moved between a non-connected position and a position connected to ground,
  wherein the SEPON device is configured to be installed on the bus assembly as a single module with the load sled side in physical contact and electrical communication with the neutral bar.

11. The switchboard or panelboard assembly of claim 10, wherein the SEPON device is installed adjacent to and below a main breaker that is installed on the bus assembly.

12. The switchboard or panelboard assembly of claim 11, wherein the SEPON device is further disposed below a nonconductive barrier that separates the SEPON device from the main breaker.

13. The switchboard or panelboard assembly of claim 10, wherein the lug terminal is accessible from the service entrance portion for establishing a physical and electrical connection with the external line neutral to receive the line neutral current.

14. The switchboard or panelboard assembly of claim 10, wherein the neutral disconnect link is further accessible from the service entrance portion for moving the neutral disconnect link between the first and second positions.

15. The switchboard or panelboard assembly of claim 10, wherein the main bonding jumper is further accessible from the service entrance portion for moving the main bonding jumper between the connected and non-connected positions.

16. The switchboard or panelboard assembly of claim 10, wherein each of the load sled side and the line sled side has an elongated section and a perpendicular section, the elongated sections of the load sled side and the line sled side being oriented parallel to each other, the perpendicular sections being oriented perpendicular to the elongated sections and parallel to each other and spaced by a gap, wherein neutral disconnect link is configured to be removably inserted within the gap for completing the continuous electrical path, and to be removed for disrupting the continuous electrical path.

17. A method of installing a service-entrance plug-on neutral (SEPON) device on a bus assembly of a switchboard or panelboard, the method comprising:
  sliding the SEPON device as a single module into a position for physical contact between a load sled side of a neutral sled of the SEPON device and a neutral bus of the bus assembly, wherein the neutral sled is electrically conductive and configured for electrical communication with the neutral bus via the physical contact;
  coupling a neutral line input conductor from an external source to one or more terminal lugs, wherein the one or more terminal lugs are electrically conductive, are configured to receive a line neutral current from the neutral line input conductor, and are electrically coupled to a line sled side of the neutral sled;
  inserting or removing a neutral disconnect link from a position between the line sled side and the load sled side of the neutral sled for establishing or disrupting, respectively, electrical continuity between the line sled side and the load sled side;
  positioning a main bonding jumper in a non-connected position for connecting only to the neutral sled or a connected position electrically coupling the neutral bus to ground.

18. The method of installing of claim 17, further comprising:
  accessing the SEPON device via a front a service entrance of the switchboard or panelboard;
  securing the SEPON device to the bus assembly with a fastening device; and
  securing at least one of the neutral disconnect link in the position between the line sled side and the load sled side and the main bonding jumper in the connected position or non-connected position.

19. The method of installing of claim 17, wherein sliding the SEPON device includes inserting spacers of the SEPON device between two or more phase buses of the bus assembly, the method further comprising:
  accessing the SEPON device via a front a service entrance of the switchboard or panelboard; and
  securing the SEPON device to the bus assembly with a fastening device that causes compression between the load sled side and the neutral bus and compression between one or more phase buses, wherein physical and electrical contact of the one or more phase buses is blocked by the inserted spacers.

20. The method of installing of claim 17,
  wherein the SEPON device is installed adjacent to and below a main breaker that is installed on the bus assembly, and
  wherein the position occupied by the installed SEPON device was previously occupied by a different type of modular device, or the method further comprises uninstalling the SEPON device, wherein the position occupied by the previously installed SEPON device is available for use by the different type of modular device.

* * * * *